United States Patent [19]

Maruyama

[11] Patent Number: 5,370,443
[45] Date of Patent: Dec. 6, 1994

[54] SEAT DEVICE

[75] Inventor: Hidekazu Maruyama, Kozono Ayase, Japan

[73] Assignee: Ikeda Bussan Company, Ltd., Kozono Ayase, Japan

[21] Appl. No.: 209,612

[22] Filed: Mar. 10, 1994

Related U.S. Application Data

[63] Continuation of Ser. No. 9,830, Jan. 27, 1993, abandoned.

[30] Foreign Application Priority Data

Feb. 27, 1992 [JP] Japan .................. 4-018308[U]

[51] Int. Cl.5 .............................................. B60N 2/22
[52] U.S. Cl. .................. 297/284.1; 297/362.11; 297/408; 74/89.15; 310/91
[58] Field of Search .......... 297/284.1, 362.1, 362.11, 297/362.12, 362.14, 408; 74/89.15; 248/635; 310/91

[56] References Cited

U.S. PATENT DOCUMENTS

| | | | |
|---|---|---|---|
| 2,668,580 | 2/1954 | Luketa | 297/361 X |
| 2,870,356 | 1/1959 | Gibson | 310/91 X |
| 3,774,462 | 11/1973 | Thompson | 74/89.15 |
| 3,941,339 | 3/1976 | McCarty | 310/91 X |
| 4,425,813 | 1/1984 | Wadensten | 248/635 X |
| 4,469,374 | 9/1984 | Kashihara et al. | 297/362 X |
| 4,641,884 | 2/1987 | Miyashita et al. | 297/284.1 |
| 4,759,587 | 7/1988 | Bucka | 297/361 |
| 4,929,019 | 5/1990 | Paakkonen et al. | 74/89.15 X |
| 4,934,203 | 6/1990 | Bailey et al. | 74/89.15 |
| 4,966,045 | 10/1990 | Harney | 74/89.15 X |
| 4,977,973 | 12/1990 | Takizawa | 297/408 X |
| 5,011,225 | 4/1991 | Nemoto | 297/408 |
| 5,058,953 | 10/1991 | Tekagi et al. | 297/408 X |
| 5,129,116 | 7/1992 | Borders et al. | 74/89.15 X |

Primary Examiner—Kenneth J. Dorner
Assistant Examiner—David E. Allred
Attorney, Agent, or Firm—Brooks & Kushman

[57] ABSTRACT

A seat device (12) including a seat back (16) having an upper seat back frame portion (34), a lower seat back frame portion (36), and a pivotal connection for pivotally supporting and connecting the upper seat back frame portion (34) to the lower seat back frame portion (36) about a pivot pin (38). A positioner extends between the two seat back frame portions and is provided with at least one motor (66), connected to a threaded shaft (62), which drives the positioner. The motor (66) is resiliently mounted to one of the seat back frame portions (34,36) using flexible bushings (80) which absorb the play between the upper and lower seat back frame portions (34,36) when the two are pivoted relative to one another.

8 Claims, 4 Drawing Sheets

SEAT DEVICE

This is a continuation of copending application Ser. No. 08/009,830 filed on Jan. 27, 1993, now abandoned.

TECHNICAL FIELD

The present invention relates to adjustable seat backs, and more particularly to automotive seats in which the seat back can bend into a desired shape.

BACKGROUND OF INVENTION

Conventional automotive seats in which the seat back can recline by pivoting relative to the seat cushion are well known to those in the art. The most commonly employed is a type in which the seat back frame has a one-piece construction. This conventional design works well when the seat back is kept in the relatively upright position. However, when the seat back is inclined backward to a position where the occupant's eyes will no longer see straight ahead, then the occupant tends to curve his back away from the seat in order to maintain straight-ahead vision. In this position, the occupant's upper back is no longer supported by the seat back. This causes strain and fatigue on the occupant's back and as a result will reduce the occupant's comfort.

In order to reduce the problems associated with this situation, some seat devices are now designed using a bendable seat back construction instead of a one-piece seat back construction. The bendable seat back has an upper and a lower seat back frame portion which are pivotally connected to each other and have a means of adjusting the angle between the upper seat back frame portion and the lower seat back frame portion. In seat backs of this type, the pivoting is achieved by either a link to a mechanism incorporated with the overall seat reclining mechanism or through an exclusive electric motor mounted adjacent to the pivot point in the seat back frame.

In the motor driven type of bendable seat back, designs have been proposed in which an upper seat back frame is rigidly connected to the upper end portion of mounting brackets which are pivotally connected to a lower seat back frame portion through the means of a nut housing having a threaded shaft, connected to the motor unit, which is mounted on the lower seat back frame portion. The mounting brackets and upper seat back frame portion pivot about the lower seat back frame portion via the nut housing. However, the above-mentioned type of mechanism, which includes the threaded shaft and nut housing, has a drawback in that the mounting bracket pivots in a circular arc whereas the threaded screw and nut combination moves linearly when acted on by the motor. Accordingly, the device needs a mechanism for eliminating this mismatch of movements when pivoting.

This is currently accomplished by slotting the connection between the mounting brackets and the nut housing thereby taking up the positional mismatch by allowing for free play between these two members. However, due to the slotted connection between these two members, the loose fit causes play between the upper seat back frame portion and the lower seat back frame portion. This play can be an annoyance to the occupant who wishes for firm support on his back.

SUMMARY OF THE INVENTION

An object of this invention is to incorporate a mechanism in a motor driven bendable seat back assembly that will allow for adjustments of the upper seat back frame portion relative to the lower seat back frame portion without allowing any free play between the two portions.

Specifically, the invention contemplates a seat back comprised of a seat back frame which includes a lower seat back frame portion, an upper seat back frame portion and a pivotal connection for pivotally supporting and connecting the upper seat back frame portion on the lower seat back frame portion about a pivotal axis. The seat back frame further includes a positioner extending between one seat back frame portion and the other seat back frame portion at a spaced location from the pivotal axis. The positioner includes at least one motor unit having a resilient mount that provides support thereof on the one seat back frame portion with the motor also having a threaded rotary output. The positioner also includes a nut received by the threaded rotary output and a pivotal connector that pivotally connects the nut to the other seat back frame portion such that operation of the motor unit tilts the upper seat back frame portion relative to the lower seat back frame portion.

The foregoing and other features and advantages of the present invention are readily apparent from the following detailed description of the best mode for carrying out the invention when taken in connection with the accompanying drawings.

BEST MODE FOR CARRYING OUT THE INVENTION

FIGS. 1-5 show an embodiment of a seat device which is equipped with a bendable seat back according to the present invention. The following description will be directed to a case in which the present invention is applied to an automotive seat.

Figure 1:
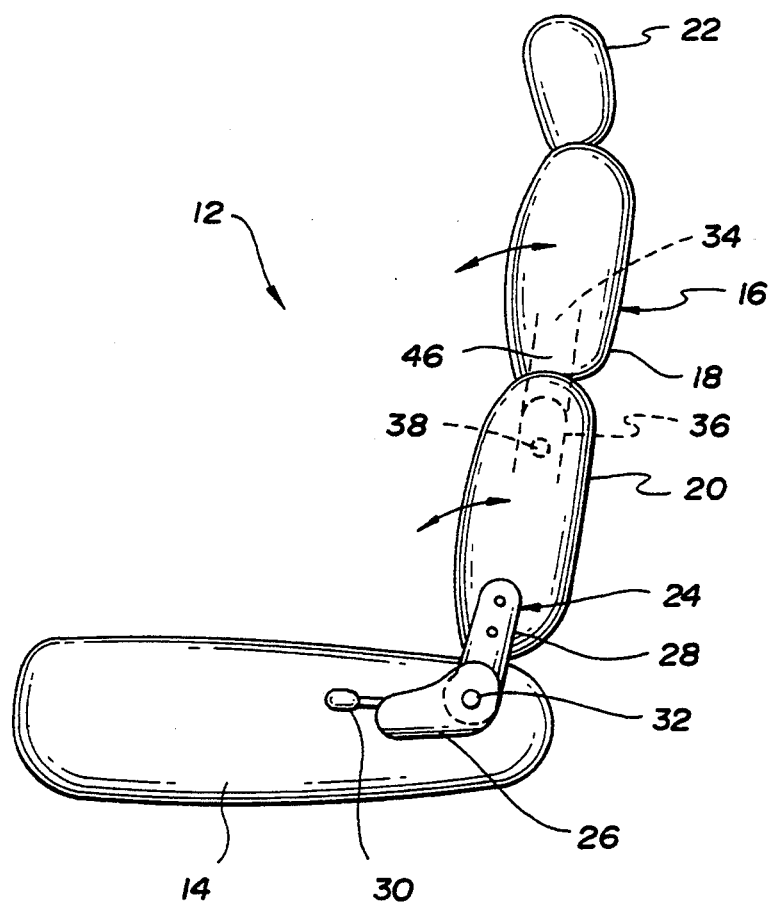
FIG. 1 is a side view of a seat in accordance with the present invention.

Shown in FIG. 1, the automotive seat 12 is comprised of a seat cushion 14 and a seat back 16 which is raised at the rear end of the seat cushion. The seat back 16 has a divided construction in which upper and lower seat bodies 18, 20, respectively, are separated with a pivot shaft portion 38 interposed therebetween. The upper seat body 18, which constitutes part of the seat back 16, has at its upper end a headrest 22 mounted thereto. The lower seat body 20 is pivotally connected to and supported by the seat cushion 14 by means of a reclining mechanism 24 which is comprised of a base 26, an arm 28 pivotally connected to the base 26 through a pivot shaft supporting portion 32 and an operation lever 30 for operating the reclining mechanism. Various types of reclining mechanisms 24 may be used. For example, a manual type powered by manual labor, an electrical power type including an electric motor, a dual type having respective devices on both sides of the seat, or the like.

Figure 2:
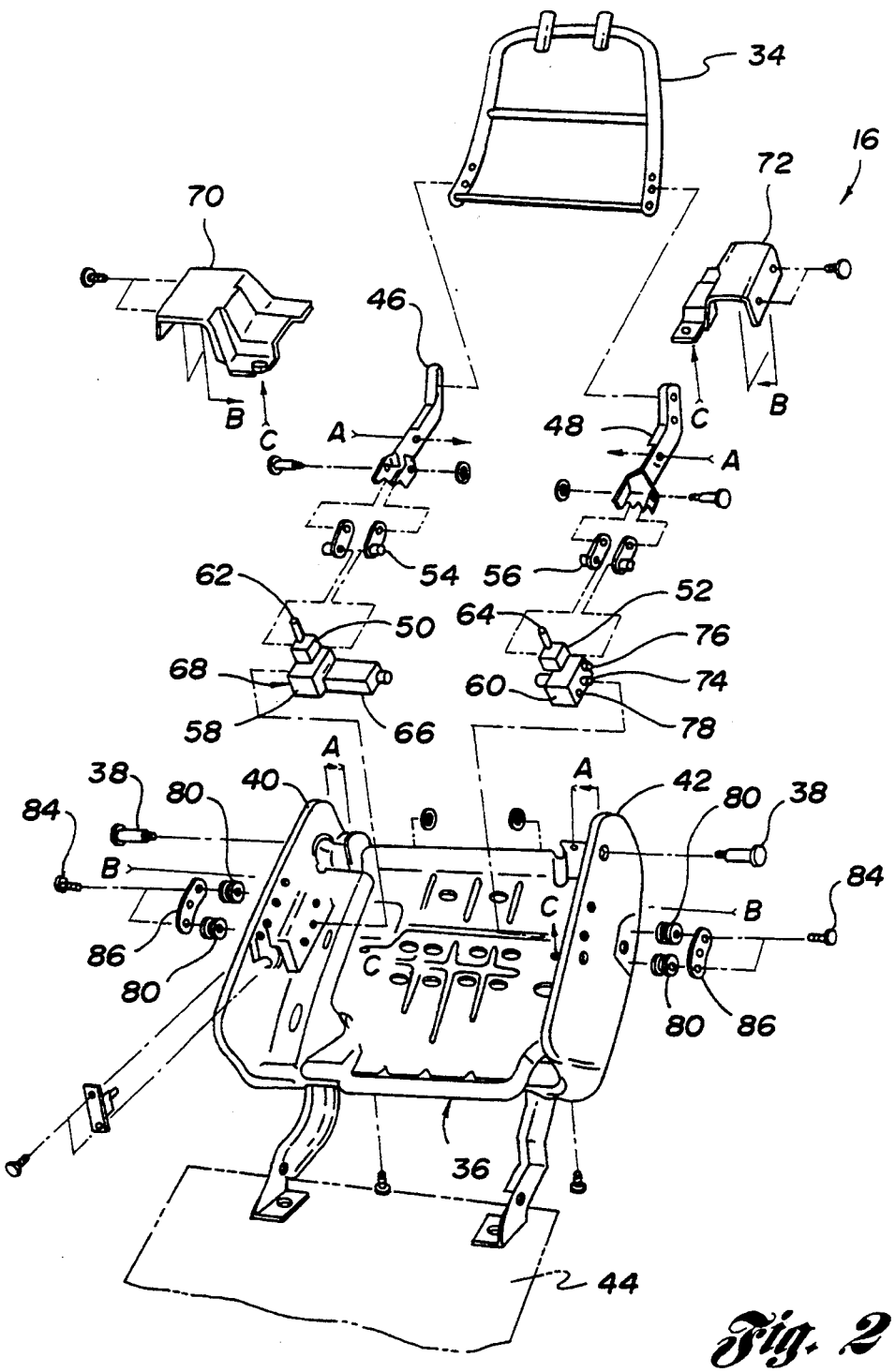
FIG. 2 is an exploded view of a seat assembly in accordance with the present invention.

As is illustrated in FIGS. 1 and 2, the upper seat body 18 and the lower seat body 20 which constitute the bendable seat back 16 are constructed of upper and lower seat back frame portions 34, 36, respectively, which are provided by dividing the seat back 16 into two parts. The seat back frame portions 34, 36 are pivotally connected to each other by means of a pivot pin 38. With this arrangement, the supporting surface of the seat back 16 can be freely pivoted to a desired position, so that a desired seat occupant sitting posture can be set and such sitting posture can be obtained in cooperation with the lower seat body 20 when inclined by the reclining device 24.

In FIGS. 1 and 2 are shown left and right laterally spaced side panel portions 40, 42 of the lower seat back frame portion 36. A seat cushion frame 44 is arranged below the seat back frame portion 36. The upper and lower seat back frame portions 34, 36 and the seat cushion frame 44 are covered with common seat pad materials and outer skin members to constitute the upper and lower seat bodies 18, 20 and the seat cushion 14. Connected to the left and right side panel portions 40, 42 are the reclining mechanism arms 28.

Figure 3:
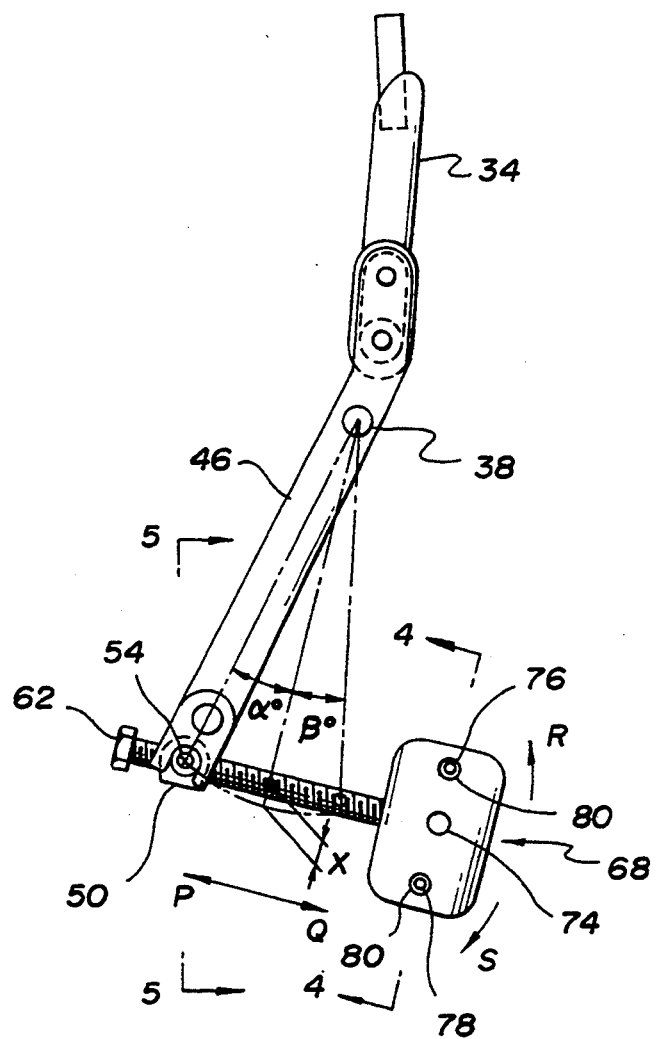
FIG. 3 is a side view of the seat back positioning mechanism in accordance with the present invention.
Figure 4:
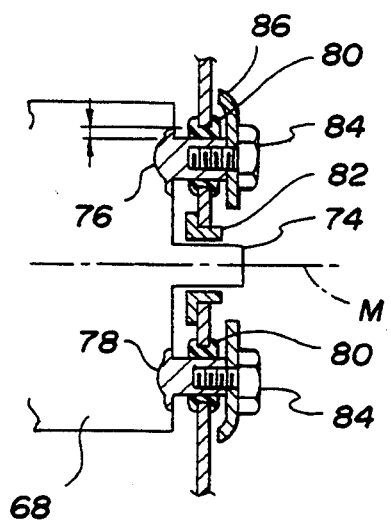
FIG. 4 is a sectional view taken along lines 4—4 in FIG. 3.
Figure 5:
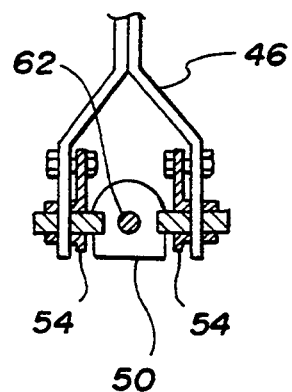
FIG. 5 is a sectional view taken along lines 5—5 in FIG. 3.

With respect to FIGS. 2-5, left and right mounting brackets 46, 48 are pivotally connected to the left and right side panel portions 40, 42, respectively, of the lower seat back frame portion 36 and are connected at their upper end to the lower end of the upper seat back frame portion 34 using bolts or the like. Left and right nut housings 50, 52 are rotatably mounted through left and right pivotal connector bearing members 54, 56, respectively, to the lower ends of the mounting brackets 46, 48, which have tines 55 provided with a semi-circular notch 57 at the end of the tines 55. The pivotal connector bearing members 54,56 have cylindrical protrusions 59 which are mounted within the semi-circular notches 57 without play and also are mounted to the nut housings 50,52 as shown in FIG. 5. The pivotal connector bearing members 54,56 are held in place by fasteners 61.

Left and right gear boxes 58, 60 are mounted to the left and right side panel portions 40, 42, respectively, and have respective threaded rotary output shafts 62, 64 rotatably supported thereby. The threaded shafts 62, 64 extend in a fore-and-aft direction of the seat back 16 and are engaged with respective nut housings 50, 52. The left gear box 58 is provided with an electric motor 66 for driving the threaded shaft 62. With this, a motor unit 68 is constituted.

In the illustrated embodiment, the right side is also provided with a gear box 60. In order to drive the right threaded shaft 64, a torque transmitting shaft (not shown) is provided through which the torque of the motor 66 is transmitted to the right threaded shaft 64. However, such torque transmitting shaft may be omitted along with the right nut housing 52, the right threaded shaft 64 and the right gear box 60 if so desired. The components on the left side would then control all of the pivot motion between the two seat back frame portions 34, 36. For example, only the motor unit 68, which is connected through the flexible bushing 80 to one side panel portion 40 of the lower seat back frame portion 36, may have the above-mentioned construction and the nut housing 52 on the other side panel portion 42 may be omitted with the right mounting bracket 48 pivotally connected directly to the right side panel portion 42.

In FIG. 2, protector covers 70, 72 are arranged at the side panel portions 40, 42 of the lower seat back frame portion 36 to cover the support shafts 74 of the mounting brackets 46, 48. With this arrangement, the support shafts 74 are protected from the pad material of the seat covers.

The pivot assembly is seen in FIGS. 2 to 5. A support shaft 74 is provided on the left side of the motor unit 68, the support shaft 74 projecting in a direction perpendicular to the threaded shaft 62 and mounting bosses 76, 78 which extend in parallel with the support shaft 74. The right side is arranged similarly. The support shafts 74 are rotatably supported on the side panel portions 40, 42 and the two mounting bosses 76, 78 are rotatably connected to the side panel portions 40, 42 through flexible bushings 80.

In FIGS. 2 and 4, a bearing 82 maintains the support shaft 74 on a motor axis "M" which projects from the left gear box 58. A similar arrangement is also employed in the other side on which the right gear box 60 is arranged. In this embodiment, within the left and right gear boxes 58, 60, are rotation direction changing mechanisms which include bevel gears (not shown) or the like. The support shaft 74 is a motor shaft or a motor transmitting shaft which is connected to a motor shaft. However, the present invention is not limited to such arrangement. That is, any arrangement can be used so long as, in the relationship between the electric motor 66 and the threaded shaft 62, the support shaft 74 is located on an axis which is substantially identical to the motor axis "M" or an axis which is perpendicular to the motor axis "M".

Stopper screws 84 are screwed to outer ends of the mounting bosses 76, 78, and a cover plate 86 serves as a washer. Separate washers may also be used for independently covering the mounting bosses 76, 78.

The seat back 16 can be readily assembled by mounting the motor unit 68, the mounting brackets 46, 48 and their associated parts to the lower seat back fame portion 36 and then mounting the upper seat back frame portion 34 to the mounting brackets 46, 48.

In operation, when the threaded shafts 62, 64 are rotated by energizing the electric motor 66, the nut housings 50, 52, which are connected to the corresponding lower ends of the mounting brackets 46, 48 and engaged with the threaded shafts 62, 64, are urged to move straightly along the threaded shafts 62, 64 in the direction of the arrow "P-Q" when the shafts 62, 64 are in their undeflected state shown in FIG. 3. However, the nut housings 50, 52 are maintained at a constant distance from the pivot axis by brackets 46, 48. A mismatching distance "X" occurs between the linear axes of the output shafts in their undeflected state and the arcuate movement of the lower end portions of the mounting brackets 46, 48. This mismatch is absorbed by the resilient deformation of the flexible bushings 80 about the support shaft 74 of the motor unit 68 connected to the side panel portions 40, 42, with the flexible bushings 80 movably supporting the mounting bosses 76, 78. The flexible bushings are preferably made of a resilient rubber, and press fit into holes provided in the side panel portions 40,42.

For example, as shown in FIG. 3, when the nut housing 50 is moved in the direction of the arrow "Q" and thus the mounting bracket 46 is moved by an angle "α" about the pivot pin 38, the motor unit 68 is rotated in the direction of "R" about the support shaft 74. A positional mismatch "X" which occurs during this movement is absorbed by the resilient deformation of the flexible bushings 80 which support the mounting bosses 76, 78. When the mounting bracket 46 is further rotated by an angle "β" from the above-mentioned position, the motor unit 68 is rotated back in the direction of "S" about the support shaft 74. Again, the undesired positional mismatch is absorbed by the resilient deformation of the flexible bushings 80. The permitted range of the resilient deformation of the flexible bushings 80 may be such a degree as to absorb a positional mismatch which is accompanied by the positional relationship between the parts and the movement of the same.

In a conventional arrangement, a motor unit is connected to the frame and a play is provided between a mounting bracket connected to an upper frame and a nut housing for absorbing the above-mentioned positional mismatching. While in the present invention, the upper seat back frame portion 34 is pivotally moved relative to the lower seat back frame portion 36 with an arrangement in which such unwanted play is removed and any problems caused by such play are eliminated. Thus, the seat occupant supporting surface can be moved to a desired position, when needed, according to the taste of the seat occupant without play between the upper and lower seat back frame portions 34, 36.

The apparatus of the present invention has been described with reference to a preferred embodiment and is to be understood as being exemplary. Various changes and modifications are possible to the apparatus above within the spirit and scope of the present invention. The scope of the present invention should be determined by reference to the following claims.

What is claimed is:

1. A seat comprising:
    a lower seat back frame;
    an upper seat back frame pivotally connected to the lower seat back frame about a pivot axis;
    a motor positioned in one of the lower or upper seat back frames by a boss and at least one flexible bushing disposed between the motor and the one seat back frame, the motor having a threaded rotary output; and
    a nut received on the threaded rotary output and engaged with the upper seat back frame and maintenance at a predetermined distance from the pivot axis by a bracket extending from said axis such that rotation of the rotary output moves the nut therealong and whereby the predetermined distance is permitted to remain constant by deformation of said flexible bushing.

2. The seat of claim 1 wherein the motor includes a support shaft extending generally orthogonally to the threaded rotary output and pivotably supported in the one seat back frame, any positional mismatch of the threaded rotary output during movement of the nut being absorbed by resilient deformation of the flexible bushing.

3. The seat of claim 2 wherein the motor includes at least one mounting boss extending generally parallel to the support shaft and engaged with a corresponding flexible bushing.

4. The seat of claim 3 wherein the flexible bushing have press fits with the one seat back frame, and the mounting boss is cylindrical and protrudes through the one seat back frame to threadingly engage an associated stopper screw.

5. The seat of claim 2 wherein the support shaft is received in a side panel portion of the lower seat back frame.

6. The seat of claim 5 wherein a tine is connected to the upper seat back frame and extends therefrom, the tine having a semicircular notch formed therein for engagement with the nut.

7. The seat of claim 1 further comprising a second motor positioned in the one seat back frame by at least one flexible bushing disposed between the second motor and the one seat back frame, the motor having a threaded rotary output; and
    a nut received on the threaded rotary output of the second motor and engaged with the upper seat back frame at a predetermined distance from the pivot axis such that rotation of the rotary output moves the nut therealong and the predetermined distance is maintained constant.

8. The seat of claim 1 wherein the motor comprises an electric motor including a gear box driven by the electric motor.

* * * * *